(12) United States Patent
Kwon et al.

(10) Patent No.: US 8,942,749 B2
(45) Date of Patent: Jan. 27, 2015

(54) METHOD AND DEVICE FOR USER SCHEDULING AND MANAGING TRANSMIT POWER IN A COMMUNICATION SYSTEM

(75) Inventors: Tae Soo Kwon, Hwaseong-si (KR); Wei Yu, Toronto (CA); Chang Yong Shin, Seoul (KR); Chan Soo Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 918 days.

(21) Appl. No.: 12/816,884

(22) Filed: Jun. 16, 2010

(65) Prior Publication Data

US 2011/0077041 A1 Mar. 31, 2011

(30) Foreign Application Priority Data

Sep. 28, 2009 (KR) .................. 10-2009-0091542

(51) Int. Cl.
*H04B 7/00* (2006.01)
*H04W 52/26* (2009.01)
*H04W 52/40* (2009.01)
*H04W 52/28* (2009.01)
*H04W 72/04* (2009.01)
*H04W 84/04* (2009.01)

(52) U.S. Cl.
CPC .............. *H04W 52/26* (2013.01); *H04W 52/40* (2013.01); *H04W 52/265* (2013.01); *H04W 52/267* (2013.01); *H04W 52/281* (2013.01); *H04W 72/0453* (2013.01); *H04W 84/045* (2013.01)
USPC ....................................................... 455/522

(58) Field of Classification Search
CPC ............. H04B 5/0037; H04W 52/243; H04W 72/0406
USPC ........................................................... 455/520
See application file for complete search history.

(56) References Cited

U.S. PATENT DOCUMENTS

| | | | | |
|---|---|---|---|---|
| 6,728,226 | B1* | 4/2004 | Naito | 370/328 |
| 8,009,581 | B2* | 8/2011 | Frenger et al. | 370/252 |
| 2002/0197999 | A1* | 12/2002 | Wu et al. | 455/452 |

(Continued)

FOREIGN PATENT DOCUMENTS

| KR | 10-2006-0019915 | 3/2006 |
|---|---|---|
| KR | 10-0705501 | 4/2007 |

(Continued)

OTHER PUBLICATIONS

Chinese Office Action issued Apr. 30, 2014 in counterpart Chinese Application No. 201080043372.2 (12 pages, in Chinese, with partial English language translation).

(Continued)

*Primary Examiner* — Ankur Jain
(74) *Attorney, Agent, or Firm* — NSIP Law

(57) ABSTRACT

A user scheduling and transmission power controlling method in a hierarchical-cell communication system or a multi-cell communication system, and a device to perform the methods, are provided. Interference may occur between various cells in the hierarchical-cell communication system or the multi-cell communication system, and the interference may be controlled by adjusting transmission power of various cells. The various cells may determine an optimal transmission power based on a cost of a corresponding transmission power. Also, the various cells may serve various users and may propose an optimal user scheduling method.

17 Claims, 6 Drawing Sheets

(56) References Cited

U.S. PATENT DOCUMENTS

| | | | |
|---|---|---|---|
| 2005/0099973 A1 | 5/2005 | Qui et al. | |
| 2005/0169226 A1* | 8/2005 | Zeira et al. | 370/342 |
| 2007/0280175 A1 | 12/2007 | Cheng et al. | |
| 2008/0002626 A1* | 1/2008 | Yokoyama | 370/331 |
| 2008/0039129 A1 | 2/2008 | Li et al. | |
| 2008/0045260 A1* | 2/2008 | Muharemovic et al. | 455/522 |
| 2008/0123776 A1 | 5/2008 | Yu et al. | |
| 2008/0298486 A1* | 12/2008 | Venturino et al. | 375/260 |
| 2009/0186623 A1* | 7/2009 | Matsuzawa | 455/447 |
| 2009/0316805 A1* | 12/2009 | Miao et al. | 375/260 |

FOREIGN PATENT DOCUMENTS

| | | |
|---|---|---|
| KR | 10-2007-0091788 | 9/2007 |
| KR | 10-2008-026225 | 3/2008 |
| KR | 10-2008-0053679 | 6/2008 |

OTHER PUBLICATIONS

Qiu, Jing, et al. "Joint power and data rate allocation for the downlink in CDMA systems based on utility function." Beijing Youdian Daxue Xuebao/ Journal of Beijing University of Posts and Telecommunication 28.5 (2005): 106-109.

Ma, Shou-gui, et al. "Call Admission Control in TDD-CDMA-HCS System" Journal of Applied Sciences—Electronics and Information Engineering, vol. 27 No. 3 (2009): (pp. 221-225).

Huang, Xiao-yan, et al. "Utility-Based Resource Allocation for Heterogeneous Services in OFDM Wireless Networks." Application Research of Computers 5 (2009): 073. (pp. 1860-1864).

* cited by examiner

METHOD AND DEVICE FOR USER SCHEDULING AND MANAGING TRANSMIT POWER IN A COMMUNICATION SYSTEM

CROSS-REFERENCE TO RELATED APPLICATION(S)

This application claims the benefit under 35 U.S.C. §119(a) of Korean Patent Application No. 10-2009-0091542, filed on Sep. 28, 2009, in the Korean Intellectual Property Office, the entire disclosure of which is incorporated herein by reference for all purposes.

BACKGROUND

1. Field

The following description relates to an optimal transmission power technology, and more particularly, to a technology to determine an optimal user schedule and an optimal transmission power of each cell in a hierarchical-cell communication system or a multi-cell communication system.

2. Description of Related Art

Studies on a hierarchical-cell communication system or a multi-cell communication system including a plurality of cells are currently being conducted to improve the data transmission rate and the reliability of communication while at the same time using limited radio resources. For example, the plurality of cells may include a cellular base station, a femto base station, a fixed base station, a mobile base station, a relay station, terminals, and the like.

For example, each of a plurality of base stations in a plurality of cells may simultaneously use limited radio resources, such as, frequency, time, code resources, and the like, to improve efficiency in using the radio resource and to communicate with corresponding terminals. Also, when the plurality of base stations simultaneously use the limited radio resources, various difficulties occur, such as interference occurring in between the terminals that causes a decrease of a throughput to and from the terminals.

A dynamic spectrum management (DSM) scheme is proposed to solve the difficulties caused by the interference. According to the DSM scheme, each of the plurality of base stations may dynamically adjust spectrum power to decrease the interference received by other cells. In this example, determining of optimal transmission powers is important to decrease the interference.

In addition, each of the plurality of cells may perform user scheduling to serve multi-users. A result of the user scheduling may affect the throughput of the hierarchical-cell communication system or the multi-cell communication. Thus, there is a desire to consider user scheduling when determining the optimal transmission powers and/or to consider the transmission powers to determine an optimal user scheduling.

SUMMARY

In one general aspect, there is provided a method of controlling a transmission power, the method including calculating a cost of the transmission power based on the satisfaction of a quality of service demanded by a target receiver, and based on a decrease of transmission rate in at least one neighbor cell that is caused by an increase of transmission power corresponding to the target receiver, and repeatedly updating the transmission power based on the calculating.

The method may further include receiving information about priority values of a plurality of cells, interference channel information of a plurality of receivers, and information about the satisfaction of a quality of service demanded by the plurality of receivers, wherein the calculating includes calculating the cost of the transmission power based on the received information.

The calculating may further include calculating the cost of the transmission power based on a priority value of a target cell that includes the target receiver.

The calculating may further include updating the cost of the transmission power in response to the repetitive updating of the transmission power.

The satisfaction may be evaluated based on a target transmission rate of the target receiver and an average transmission rate of a target transmitter.

The priority value of the target cell may be set differently based on whether the target cell is a macrocell or a small cell.

The method may further include determining whether a transmission rate to the target receiver is converged in order to determine a transmission power to be applied.

The updating repeatedly may update the transmission power based on a Karush-Kuhn-Tucker (KKT) method or Newton's method.

In another aspect, there is provided a method for performing user scheduling and controlling transmission power, the method including calculating a cost of the transmission power based on the satisfaction of a quality of service demanded by a target receiver, and based on a decrease of a transmission rate in at least one neighbor cell that is caused by an increase of a transmission power corresponding to the target receiver, repeatedly updating the transmission power based on the calculated cost, and updating the target receiver by performing the user scheduling at the updated transmission power.

The updating may update the target receiver to maximize a sum-data rate based on a proportional fairness scheme at the updated transmission power.

The calculating may calculate the cost of the transmission power further based on a priority value of a target cell that includes the target receiver.

In another aspect, there is provided a computer readable storage media having stored therein program instructions to cause a processor to implement a method for controlling transmission power, the method including calculating a cost of the transmission power based on the satisfaction of a quality of service demanded by a target receiver, and based on a decrease of a transmission rate in at least one neighbor cell caused by an increase of transmission power corresponding to the target receiver, and repeatedly updating the transmission power based on the calculated cost.

In another aspect, there is provided a communication device, including a cost calculator configured to calculate a cost of a transmission power based on the satisfaction of a quality of service demanded by a target receiver, and based on a decrease of a transmission rate in at least one neighbor cell caused by an increase of the transmission power corresponding to the target receiver, and a power updating unit configured to repeatedly update the transmission power based on the calculated cost.

The communication device may further include a receiving unit to receive information about priority values of a plurality of cells, interference channel information of a plurality of receivers, and information about the satisfaction of a quality of service demanded by the plurality of receivers, wherein the cost calculator calculates the cost of the transmission power based on the received information.

The cost calculator may further calculate the cost of the transmission power based on a priority value of a target cell that includes the target receiver.

The communication may further include a scheduler to update the target receiver by performing user scheduling at the updated transmission power.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
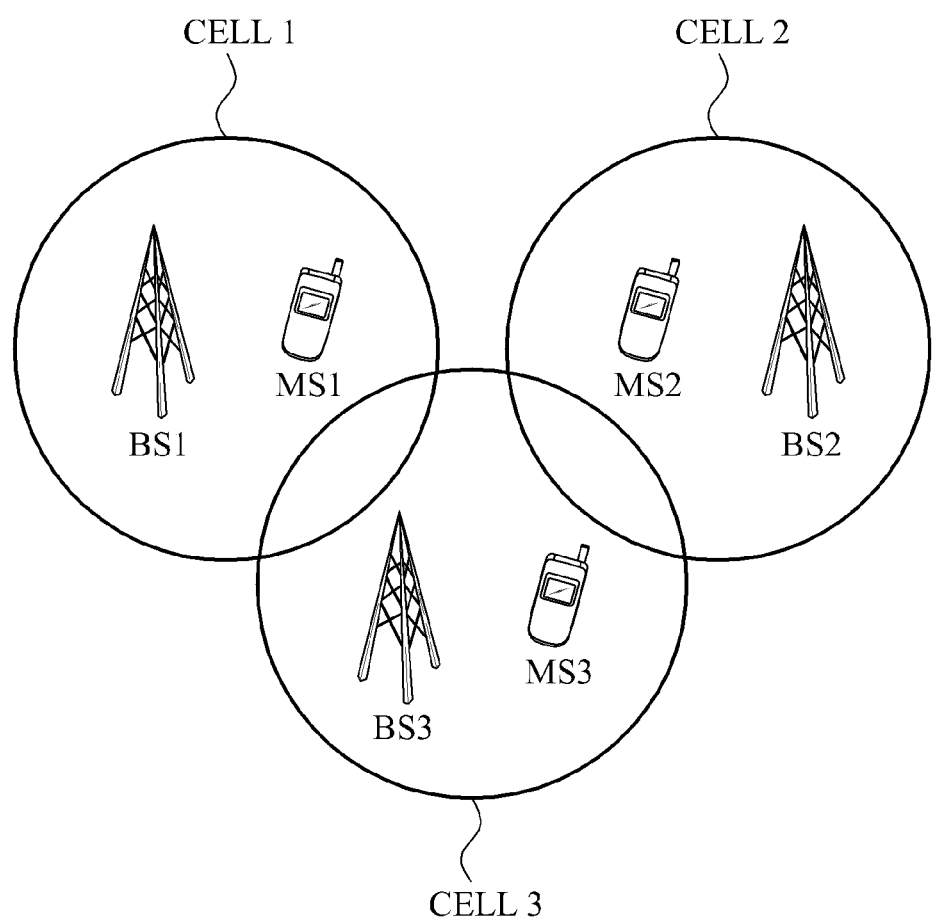
FIG. 1 is a diagram illustrating an example of a multi-cell communication system.

FIG. 1 illustrates an example of a multi-cell communication system.

Referring to FIG. 1, the multi-cell communication system includes a plurality of macro cells, and each of the plurality of macro cells includes a single transmission/reception pair. For example, macrocell 1 includes a transmission/reception pair of a macro base station 1-terminal 1, macrocell 2 includes a transmission/reception pair of a macro base station 2-terminal 2, and macrocell 3 includes a transmission/reception pair of a macro base station 3-terminal 3. In some embodiments, unlike the diagram of FIG. 1, at least one of the plurality of macrocells may include two or more terminals, and may include two or more transmission/reception pairs.

When the plurality of transmission/reception pairs use overlapped radio resources, inter-cell interference may occur between the plurality of transmission/reception pairs. The inter-cell interference may be reduced by a dynamic spectrum management (DSM) scheme.

According to the DSM scheme, some or all of the plurality of cells predict an amount of interference generated in other cells based on a status of a desired channel and the status of interference channels, and calculate the respective transmission powers based on the amount of interference. For example, when the macrocell 1 uses frequency bands F1, F2, and F3, the macrocell 1 may increase a transmission power in the frequency band F1 based on an amount of interference generated in the macrocell 2 and the macrocell 3, and may decrease transmission powers in the frequency bands F2 and F3. The macrocell 2 and the macrocell 3 also may perform an operation similar to the operation of the macrocell 1. Accordingly, the macrocell 1, the macrocell 2, and the macrocell 3 may determine appropriate transmission powers.

In this example, optimal transmission powers for the macrocells may be determined to maximize a total throughput of the multi-cell communication system. For example, a quality of service (QoS) demanded by each terminal may vary from the QoS demanded by other terminals. In addition, a priority value of each macro cell may also be different from each other, and thus, proportional fairness needs to be considered. Accordingly, the optimal transmission powers or the macrocells may be determined to maximize the total throughput of the multi-cell communication system based on the assumption that a proportional fairness between terminals in all the macrocells is maintained.

Also, when a given macrocell includes two or more transmission/reception pairs, determination on a frequency band or a frequency tone to be allocated to each terminal in the given macrocell may affect the throughput of the given macrocell and the total throughput of the multi-cell communication system. The user schedule may be determined to maximize the throughput of the multi-cell communication system on the assumption that the proportional fairness between terminals in all macrocells is maintained.

Accordingly, to improve the throughput of the multi-cell communication based on proportional fairness between terminals in all macrocells, an optimal transmission power allocating method, and an optimal user scheduling method used in each macrocell may be used.

Figure 2:
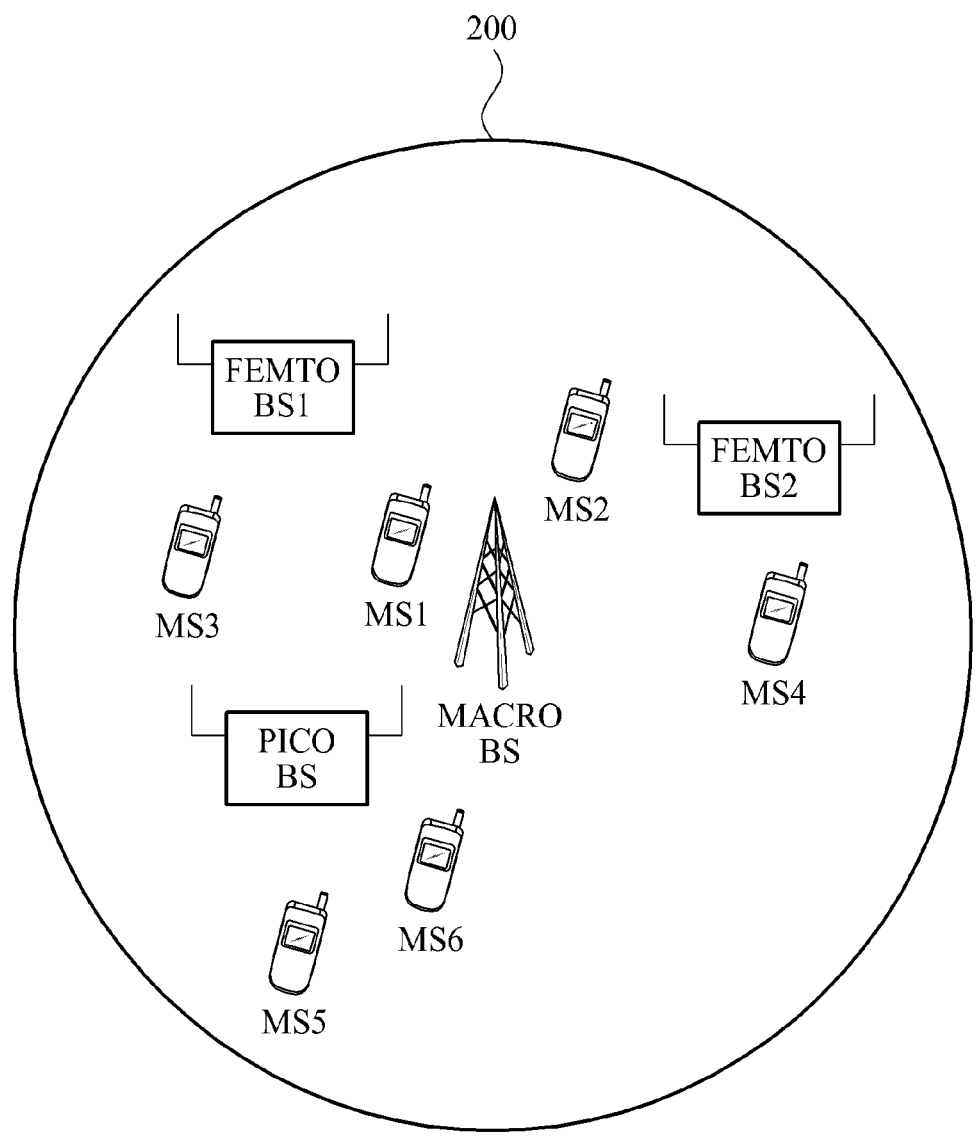
FIG. 2 is a diagram illustrating an example of a hierarchical-cell communication system.

FIG. 2 illustrates an example of a hierarchical-cell communication system.

Referring to FIG. 2, the hierarchical-cell communication system may include various small cells in addition to a macrocell 200. For example, the hierarchical-cell communication system may include a macro base station, femto base stations 1 and 2, a pico base station, and various terminals (such as terminals 1 through 6) that are served by the macro base station, the femto base stations 1 and 2, and the pico base station.

In the hierarchical communication system, interference may occur between the macrocell 200 and the small cells. Accordingly, to improve a throughput of the hierarchical-cell communication system such that a proportional fairness between terminals is maintained in all macrocells, an optimal transmission power allocating method and an optimal user scheduling method used in each macrocell may be used.

For reference, priority values of cells evaluated by the position of a service operator may be different from the priority values of cells evaluated by the position of a user. For example, the service provider may evaluate the priority values of the cells based on, for example, the amount of load of the cells, an extent of a Dead Zone, a total capacity of the hierarchical-cell communication system, charging, and the like. Whereas, the user may evaluate the priority values of the cells based on, for example, a charge, a capacity of a terminal, a power consumption of the terminal, and the like. Generally, a priority value of the macrocell may be evaluated to be higher than priority values of the small cells. The embodiments described herein assume that the priority values of the cells are determined based on various combinations of the described factors.

In this example, there are L cells, and there are K users that exist in each cell. Also in this example, the hierarchical-cell or the multi-cell communication system uses an orthogonal frequency division multiple access (OFDMA) scheme having N frequency tones. Also, it is assumed that the hierarchical-cell or the multi-cell communication system is applied to a TDD scheme.

To obtain proportional fairness, the hierarchical-cell or the multi-cell communication system may use Equation 1 as given below.

$$\max \sum_{lk} T_{lk} \log(\overline{R}_{lk}).$$ [Equation 1]

In Equation 1, $\overline{R}_{lk}$ represents the long term average transmission rate of a $k^{th}$ user in a first cell, $T_{lk}$ represents a weight corresponding to a target quality of a service (QoS) for the $k^{th}$ user in the first cell, and $T_{lk}$ is inserted to Equation 1 to obtain the proportional fairness.

In this example, the number of users that are capable of transmitting a signal at a given frequency tone in a signal cell is one. Also, $h_{lmk}^n$ is a channel between a first base station and a $k^{th}$ user in a $m^{th}$ cell, and an uplink user schedule and a downlink user schedule are determined by user scheduling functions $f_U(l, n)$ and $f_D(l, n)$, respectively. In this example, $f_U(l, n)$ allocates the $k^{th}$ user to a first cell at an $n^{th}$ frequency tone in the uplink, and $f_D(l, n)$ allocates the $k^{th}$ user to a first cell at a $n^{th}$ frequency tone in the downlink.

An uplink transmission power and a downlink transmission power at the $n^{th}$ frequency tone in the first cell are represented as $P_{U,l}^n$ and $P_{D,l}^n$, respectively. In this example, $P_{U,l}^n$ is allocated to the user (terminal) in the uplink, and $P_{D,l}^n$ is allocated to a base station in the downlink.

For example, the scheduling and the transmission power allocating for obtaining a proportional fairness in the downlink may be the same as selecting of $k=f_D(l, n)$ and determining of $P_{D,l}^n$, respectively, based on Equation 2 as given below.

$$\max \sum_{l,k} T_{D,lk} \log(\overline{R}_{D,lk})$$ [Equation 2]

$$\text{s.t. } R_{D,lk} = \sum_{n:k=f_D(l,n)} \log\left(1 + \frac{P_{D,l}^n |h_{llk}^n|^2}{\Gamma\left(\sigma^2 + \sum_{j\neq l} P_{D,j}^n |h_{jlk}^n|^2\right)}\right)$$

$$\overline{P}_{D,l} \leq P_{D,l}^{max} \; \forall \, l$$

$$0 \leq P_{D,l}^n \leq S_D^{max} \; \forall \, l, n$$

In Equation 2, $\overline{R}_{D,lk}$ is an average transmission rate, and $R_{D,lk}$ is an instantaneous downlink transmission rate with respect to a $k^{th}$ user in the first cell.

Also, the scheduling and the transmission power allocating for obtaining a proportional fairness in the uplink may be the same as selecting $k=f_U(l, n)$ and determining $P_{U,l}^n$, respectively, based on Equation 3 as given below.

$$\max \sum_{l,k} T_{U,lk} \log(\overline{R}_{U,lk})$$ [Equation 3]

-continued $$\text{s.t. } R_{U,lk} = \sum_{n:k=f_U(l,n)} \log\left(1 + \frac{P_{U,l}^n |h_{llk}^n|^2}{\Gamma\left(\sigma^2 + \sum_{j\neq l} P_{U,j}^n |h_{ljk'}^n|^2\right)}\right),$$

where $k' = f_U(j, n)$ $$\overline{P}_{U,lk} \leq P_{U,lk}^{max} \; \forall \, l, k$$

$$0 \leq P_{U,l}^n \leq S_U^{max} \; \forall \, l, n$$

In Equation 3, $\overline{R}_{U,lk}$ is an average transmission rate, and $R_{U,lk}$ is an instantaneous uplink transmission rate with respect to a $k^{th}$ user in the first cell.

In addition, $\overline{P}_{U,lk}$ indicates average uplink transmission powers, for example, a sum of transmission powers at various frequency tones. $\overline{P}_{U,lk}$ satisfies an uplink transmission power limitation $P_{U,lk}^{max}$, and $\overline{P}_{D,l}$ indicates average downlink prnax transmission powers, and satisfies a downlink transmission power limitation $P_{D,l}^{max}$. The averaging of an uplink transmission power and a downlink transmission power indicates an exponential weighting. For example, $\overline{P}_{D,l}$ may be updated as given in Equation 4 in each time epoch.

$$\overline{P}_{D,l}^{current} = \beta_0 \overline{P}_{D,l}^{previous} + \sum_n P_{D,l}^n$$ [Equation 4]

$$0 < \beta_0 < 1$$

In Equation 4, $\beta_0$ is a forgetting factor. In the uplink, the average uplink transmission powers may be updated in the same manner as in the downlink.

In Equations 2 and 3, $T_{D,lk}$ and $T_{U,lk}$ represent proportional fairness weights. For example, $T_{D,lk}$ and $T_{U,lk}$ may be determined differently based on a QoS demanded by the user. Also, $\Gamma$ represents an SNR gap corresponding to selection of a modulation scheme and a coding scheme, and $S_U^{max}$ and $S_D^{max}$ indicate an uplink transmission power limitation and a downlink transmission power limitation, respectively.

Optimization of Equations 2 and 3 may be obtained by repeating a user scheduling operation and a transmission power allocation operation. During the user scheduling operation, the transmission power allocation is regarded as being fixed, and during the transmission power allocating operation, the user scheduling is regarded as being fixed.

The proportional fairness user scheduling is widely used for uni-cell systems. The proportional fairness user scheduling may perform scheduling of users in each time epoch based on Equation 5 as given below.

$$k^* = \operatorname{argmax} \frac{T_k}{\overline{R}_k}$$ [Equation 5]

In Equation 5, $T_k$, is a target transmission rate of a $k^{th}$ user, $\overline{R}_k$ is an average transmission rate that exponentially decreases. For example, $\overline{R}_k$ may be calculated based on Equation 6 as given below.

$$\overline{R}_k = \alpha \overline{R}_k + (1-\alpha) R_k$$ [Equation 6]

When an instantaneously obtainable transmission rate $R_k$ is the same for each of the users, the described scheduling policy maximizes the proportional fairness, because $$\frac{T_k}{R_k}$$

may be considered as a derivative of $T_k \log(\overline{R}_k)$. Accordingly, a proportional fairness policy may be considered as a greedy policy that selects a user and that is capable of maximizing an increase rate of the throughput of the total system.

The examples described herein may obtain proportional fairness in the multi-user and multi-cell environment. In this example, all instantaneous transmission rates $R_{l,k}$ with respect to each of the users in each of the cells may form a capacity region.

However, the interference generated by a given base station that interferes with other neighbor cells in a downlink is a function of a transmission power, and the interference is independent from the user schedule of the given base station. Accordingly, when the transmission power $P_{D,l}^n$ is fixed, the user scheduling is independently performed based on a cell unit without affecting an interference level.

For example, maximizing the proportional fairness with respect to a given cell 1 may be expressed as given in Equation 7.

$$\max \sum_k T_{D,lk} \log(\overline{R}_{D,lk}) \quad \text{[Equation 7]}$$

A user scheduling algorithm may maximize a derivative $$\sum_k \left(\frac{T_{D,lk}}{\overline{R}_{D,lk}}\right) R_{D,lk} \text{ of } \max \sum_k T_{D,lk} \log(\overline{R}_{D,lk}).$$

In Equation 7, $R_{D,lk}$ represents a sum of bit rates with respect to frequency tones, and thus, the maximization may be performed based on tone-by-tone basis.

Equivalently, the user scheduling algorithm may allocate the $k^{th}$ user at each frequency tone "n" using Equation 8.

$$f_D(l, n) = \mathrm{argmax}_k \left\{ \frac{T_{D,lk}}{\overline{R}_{D,lk}} \log \left( 1 + \frac{P_{D,l}^n |h_{llk}^n|^2}{\Gamma\left(\sigma^2 + \sum_{j \neq l} P_{D,j}^n |h_{jlk}^n|^2\right)} \right) \right\} \quad \text{[Equation 8]}$$

For example, a scheduler may select "k" at each tone to maximize a weighted instantaneous transmission rate. Weights may be calculated as $$\left(\frac{T_{D,lk}}{\overline{R}_{D,lk}}\right), \text{ and } \overline{R}_{D,lk} = \alpha \overline{R}_{D,lk} + (1-\alpha) R_{D,lk}.$$

In this example, $\alpha$ is a forgetting factor where $0 < \alpha < 1$, and $R_{D,lk}$ is calculated from a fixed transmission power allocation.

Example embodiments may consider the status of a varying direct channel and the status of interference channels in real time. For example, channels and an obtainable transmission rate region related thereto may be changed over time. Accordingly, other users may be scheduled based on, for example, a channel condition, a proportional fairness, a priority value, and the like.

In this example, the interference level being independent from the user schedule, is generally applied only to the downlink, and is not generally applied to the uplink. Accordingly, applying the proportional fairness scheduling to the uplink may include coordination between cells. However, the examples described herein may assume time division duplex (TDD) systems, and thus, the same user scheduling policy may be used in the uplink. Therefore, Equation 9 may be expressed as given below.

$$f_U(l, n) = \mathrm{argmax}_k \left\{ \frac{T_{U,lk}}{\overline{R}_{U,lk}} \log \left( 1 + \frac{P_{U,l}^n |h_{llk}^n|^2}{\Gamma\left(\sigma^2 + \sum_{j \neq l} P_{U,j}^n |h_{ljk'}^n|^2\right)} \right) \right\} \quad \text{[Equation 9]}$$

$$k' = f_U(j, n)$$

The example embodiments described herein may determine the user schedule based on Equation 8 and Equation 9. For example, the interference level may be locally measured by each user, and thus, the user scheduling operation may be independently applied in a dispersive form in each cell.

A transmission power adaptation operation and a transmission power allocation operation assume a fixed user schedule, and discover an optimal transmission power spectrum in both the uplink and the downlink. The transmission power adaptation scheme aims at maximizing a proportional fairness. Accordingly, a maximization of $\Sigma_{l,k} T_{D,lk} \log(\overline{R}_{D,lk})$ in the downlink may be equivalent to $$\max \sum_{l,k} \left(\frac{T_{D,lk}}{\overline{R}_{D,lk}}\right) R_{D,lk},$$

which is similar in the uplink.

The transmission power adaptation may be used for the maximization of the weighted total transmission rate (sum-rate), and the satisfaction of the user with respect to a target QoS demanded by the user, and may be expressed as given below in Equation 10 using an uplink weight and a downlink weight.

$$w_{D,lk} = \frac{T_{D,lk}}{\overline{R}_{D,lk}}, \quad \text{[Equation 10]}$$

$$w_{U,lk} = \frac{T_{U,lk}}{\overline{R}_{U,lk}}.$$

The means for the maximization of the weighted total transmission rate in an interference environment is a well studied matter in a digital subscriber line (DSL). However, setting of the weight is a difficult issue, and the examples described herein may user proportional fairness parameters as weights. The weights may be changed based on status of channels and a change of the user schedule.

It may be difficult to transform a means for maximization of a log-utility into a means for the maximization of the weighted total transmission rate. However, examples described herein may simplify the matter based on following methods.

The weighted total transmission rate maximization may be expressed as given below in Equation 11.

$$\max \sum_{l,k} w_{D,lk} \sum_{n:k=f_D(l,n)} \log\left(1 + \frac{P_{D,l}^n |h_{llk}^n|^2}{\Gamma\left(\sigma^2 + \sum_{j\neq l} P_{D,j}^n |h_{jlk}^n|^2\right)}\right) - \sum_l \lambda_{D,l} \overline{P}_{D,l}$$

[Equation 11]

s.t. $0 \leq P_{D,l}^n \leq S_D^{max} \; \forall \, l, n.$

For example, Equation 11 may be divided into N independent optimization matters with respect to each tone, n=1, 2, ..., N, as shown below in Equation 12.

$$\max \sum_l \left( w_{D,lk} \log\left(1 + \frac{P_{D,l}^n |h_{llk}^n|^2}{\Gamma\left(\sigma^2 + \sum_{j\neq l} P_{D,j}^n |h_{jlk}^n|^2\right)}\right) - \lambda_{D,l} P_{D,l}^n \right),$$

[Equation 12]

where $k = f_D(l, n)$
s.t. $0 \leq P_{D,l}^n \leq S_D^{max} \; \forall \, l.$

In the same manner, Equation 13 may be expressed with respect to the uplink.

$$\max \sum_l \left( w_{U,lk} \log\left(1 + \frac{P_{U,l}^n |h_{llk}^n|^2}{\Gamma\left(\sigma^2 + \sum_{j\neq l} P_{U,j}^n |h_{ljk'}^n|^2\right)}\right) - \lambda_{U,lk} P_{U,l}^n \right),$$

[Equation 13]

where $k = f_U(l, n)$
$k' = f_U(j, n)$
s.t. $0 \leq P_{U,l}^n \leq S_U^{max} \; \forall \, l.$ Each of per-tone matters, that is Equation 12 and Equation 13, may have L parameters, whereas Equation 11 has NL parameters. Accordingly, Equation 12 and Equation 13 have less parameters making them easier to handle. The original weighted total transmission rate maximization matter is simplified as a matter of determining an appropriate $\lambda_{D,l}$ and $\lambda_{U,lk}$. For example, $\lambda_{D,l}$ and $\lambda_{U,lk}$ may satisfy a power limitation, and the matter of finding out the $\lambda_{D,l}$ and may $\lambda_{U,lk}$ solved by a subgradient-like approach.

An example of a process of solving the subgradient-like approach is as follows.

1) Initiate $\lambda_{D,l}$ to a value that is not zero.
2) Solve Equation 12 to obtain $\{P_{D,l}^n\}$ with respect to n=1, 2, ..., N
3) Update $\overline{P}_{D,l} = \beta_0 \overline{P}_{D,l} + \Sigma_n P_{D,l}^n$ with respect to every l, and wherein $\beta_0 < 1$ is a constant.
4) Set $\lambda_{D,l} = (1+\beta_1)\lambda_{D,l}$ when $\overline{P}_{D,l} > \overline{P}_{D,l}^{max}$ with respect to every l, otherwise set $\lambda_{D,l} = (1-\beta_2)\lambda_{D,l}$, wherein $0 < \beta_1, \beta_2 < 1$ are constants, and repeat from step 2) for each "n".

An algorithm similar to the algorithm of the downlink may also be performed in uplinks.

There may be various methods to solve Equation 12 and Equation 13. Examples are described below. In these examples, a method that solves Equation 12 will only be described because methods that solve Equation 12 and Equation 13 are similar to each other.

1) Karush-Kuhn-Tucker (KKT) Method

An objective function of Equation 12 may be a nonconvex function. Example embodiments may focus on a repetitive approach to obtain at least one single local optimal solution. First, a KKT condition may be referred to, and derivative with respect to $P_{D,l}^n$ of an objective function may be set to zero as given below in Equation 14.

$$\frac{w_{D,lk} |h_{llk}^n|^2}{P_{D,l}^n |h_{llk}^n|^2 + \Gamma\left(\sigma^2 + \sum_{j\neq l} P_{D,j}^n |h_{jlk}^n|^2\right)} = \sum_{j\neq l} t_{D,jl}^n + \lambda_{D,l},$$

[Equation 14]

with $k = f_D(l, n)$

With respect to l=1, ..., L, a cost $t_{D,jl}^n$ of the transmission power may be expressed as given below in Equation 15.

$$t_{D,jl}^n = w_{D,jk'} \frac{\Gamma |h_{ljk'}^n|^2}{P_{D,j}^n |h_{ljk'}^n|^2} \left(\frac{(SINR_{D,j}^n)^2}{1 + SINR_{D,j}^n}\right),$$

[Equation 15]

with $k' = f_D(j, n)$ $$SINR_{D,j}^n = \frac{P_{D,j}^n |h_{ljk'}^n|^2}{\Gamma\left(\sigma^2 + \sum_{i\neq j} P_{D,j}^n |h_{ljk'}^n|^2\right)},$$

with $k' = f_D(j, n)$

When the cost $t_{D,jl}^n$ of the transmission power is fixed, the KKT condition of Equation 14 is essentially a water-filling condition. In some embodiments, simplification of Equation 14 is not be performed by Equation 16, rather, instead a new transmission power May be calculated through Equation 16.

$$P_{D,l,new}^n = \left[\frac{w_{D,lk}}{\sum_{j\neq l} t_{D,jl}^n + \lambda_{D,l}} - \frac{\Gamma\left(\sigma^2 + \sum_{j\neq l} P_{D,j}^n |h_{jlk}^n|^2\right)}{|h_{llk}^n|^2}\right]_0^{S_D^{max}},$$

[Equation 16]

with $k = f_D(l, n)$

In Equation 16, in $[\cdot]_a^b$, "a" is a lower bound, and "b" is an upper bound. Also, a second term in a right side of Equation 16 is interference and effective-combined downlink noise that are combined at $n^{th}$ frequency tone of a first base station.

To calculate Equation 16, the cost $t_{D,jl}^n$ of the transmission power may be utilized. In this example, information demanded for calculating the cost $t_{D,jl}^n$ of the transmission power may be provided from neighbor cells. That is, a given cell may calculate the cost $t_{D,jl}^n$ of transmission power based on information provided from neighbor cells, and update the transmission power using Equation 16. Also, $P_{D,l,new}^n$ may be calculated through a repetitive process.

The cost $t_{D,jl}^n$ of the transmission power is a derivative of a transmission rate of a $j^{th}$ base station with respect to a transmission power of $i^{th}$ base station, and is weighted by the proportional fairness parameter. For example, $t_{D,jl}^n$ may be represented as $-w_{D,jk} \partial R_{D,jk}/\partial R_{D,l}$ or $$t_{D,jl}^n = -\left(v_{D,j} \cdot w_{D,jk'} \cdot \frac{\partial R_{jk'}^n}{\partial P_{D,l}^n}\right).$$

In this example $k'=f_D(j, n)$. Also in this example, $$w_{D,jk'} = \frac{\text{target data rate of user } k'}{\text{average data rate of user } k'},$$

and $w_{D,jk'}$ may be a ratio of an average transmission rate of a user k' to a QoS demanded by the user k'. Also, $v_{D,j}$ is a priority value of a cell j. Example embodiments may evaluate the cost $t_{D,jl}^n$ of the transmission power based on, for example, priority values of cells, a satisfaction with respect to a QoS demanded by a target user, a decrease of a transmission rate in a neighbor cell due to an increase of the transmission power, and the like.

$P_{D,jl}^n$ imposes interference onto $j^{th}$ cells, and the interference may be evaluated as the cost $t_{D,jl}^n$ of the transmission power $P_{D,jl}^n$. Accordingly, when a total cost is low, $P_{D,jl}^n$ is dictated by a total power limitation, and when the total cost is high, $P_{D,jl}^n$ decreases.

In some embodiments, example embodiments may use Equation 17 or Equation 18 instead of Equation 16, to reduce computational complexity.

$$10 \log_{10}(P_{D,l}^n[\kappa+1]) = \gamma 10 \log_{10}(P_{D,l,new}^n) + (1-\gamma) 10 \log_{10}(P_{D,l}^n[\kappa]) \quad \text{[Equation 17]}$$

In Equation 17, k is a number of repetition, and $0 < \gamma < 1$. For example, $\gamma = 0.5$ and $\gamma = 0.1$ may be used.

$$P_{D,l,new}^n = \left[\frac{w_{D,lk}}{c \cdot \max_{j \neq l}\{t_{D,jl}^n\} + \lambda_{D,l}} - \frac{\Gamma\left(\sigma^2 + \sum_{j \neq l} P_{D,j}^n |h_{jlk}^n|^2\right)}{|h_{llk}^n|^2}\right]_0^{S_D^{max}}, \quad \text{[Equation 18]}$$

with $k = f_D(l, n)$, and c is a constant factor, for example, c=2 may be used.

2) Newton's Method

Examples may use Newton's method to solve Equation 12. Newton's method may have a fast convergence speed compared with the KKT method, and may be expressed as given below in Equation 19.

$$r_{D,lk}^n = \log\left(1 + \frac{P_{D,l}^n |h_{llk}^n|^2}{\Gamma\left(\sigma^2 + \sum_{j \neq l} P_{D,j}^n |h_{jlk}^n|^2\right)}\right), \quad \text{[Equation 19]}$$

where $k = f_D(l, n)$ $$\frac{\partial r_{D,lk}^n}{\partial P_{D,l}^n} = \frac{1}{P_{D,l}^n}\left(1 + \frac{1}{SINR_{D,l}^n}\right),$$

$$\frac{\partial r_{D,jk}^n}{\partial P_{D,l}^n} = \frac{-\Gamma |h_{ljk'}^n|^2}{P_{D,j}^n |h_{jjk'}^n|^2} \cdot \frac{(SINR_{D,j}^n)^2}{1 + SINR_{D,j}^n},$$

$$\frac{\partial^2 r_{D,lk}^n}{\partial (P_{D,l}^n)^2} = \frac{-1}{(P_{D,l}^n)^2}\left(1 + \frac{1}{SINR_{D,l}^n}\right)^2,$$

$$\frac{\partial^2 r_{D,jk}^n}{\partial (P_{D,l}^n)^2} = \left(\frac{\Gamma |h_{ljk'}^n|^2}{P_{D,j}^n |h_{jjk'}^n|^2}\right)^2 \cdot \frac{(SINR_{D,j}^n)^3 (2 + SINR_{D,j}^n)}{(1 + SINR_{D,j}^n)^2},$$

In Equation 19, $k=f_D(l,n)$, $k'=f_D(j,n)$, and "j" is not "l".

To easily solve Equation 12, Equation 20 may be expressed as given below.

$$g(P_{D,1}^n, \ldots, P_{D,L}^n) = \sum_l w_{D,lk} r_{D,lk}^n - \lambda_{D,l} P_{D,l}^n \quad \text{[Equation 20]}$$

For example, example embodiments may increase $(P_{D,1}^n, \ldots, P_{D,L}^n)$ a direction of Newton's direction. Newton's direction may be defined as given below in Equation 21.

$$[\Delta P_{D,1}^n, \ldots \Delta P_{D,L}^n] = -(\nabla^2 g)^{-1} \nabla g \quad \text{[Equation 21]}$$

In Equation 21, calculating of a Hessian matrix $\nabla^2 g$ may be complex, and thus, as given in Equation 22, off diagonal (non diagonal) terms of the Hessian matrix may be disregarded and diagonal terminal may be inverted.

$$\Delta P_{D,l}^n = -\frac{(\nabla g)_l}{(\nabla^2 g)_{ll}} \quad \text{[Equation 22]}$$

Example embodiments may change a search direction as given below in Equation 23.

$$\Delta P_{D,l}^n = -\frac{(\nabla g)_l}{|(\nabla^2 g)_{ll}|} \quad \text{[Equation 23]}$$

A first element of a gradient vector is as given below in Equation 24.

$$(\nabla g)_l = \frac{w_{D,lk}}{P_{D,l}^n}\left(1 + \frac{1}{SINR_{D,l}^n}\right) + \quad \text{[Equation 24]}$$

$$\sum_{j \neq l} w_{D,jk'}^n \frac{-\Gamma |h_{ljk'}^n|^2}{P_{D,j}^n |h_{jjk'}^n|^2} \cdot \frac{(SINR_{D,j}^n)^2}{1 + SINR_{D,j}^n} - \lambda_{D,l}$$

$$= \frac{w_{D,lk}}{P_{D,l}^n}\left(1 + \frac{1}{SINR_{D,l}^n}\right) - \sum_{j \neq l} t_{D,jl}^n - \lambda_{D,l}.$$

In a similar manner, a first diagonal term of the Hessian matrix may be the same as given below in Equation 25.

$$(\nabla^2 g)_{ll} = \frac{-w_{D,lk}}{(P_{D,l}^n)^2}\left(1 + \frac{1}{SINR_{D,l}^n}\right)^2 + \quad \text{[Equation 25]}$$

$$\sum_{j \neq l} w_{D,jk}^n \left(\frac{\Gamma |h_{ljk'}^n|^2}{P_{D,j}^n |h_{jjk'}^n|^2}\right)^2 \cdot \frac{(SINR_{D,j}^n)^3 (2 + SINR_{D,j}^n)}{(1 + SINR_{D,j}^n)^2}$$

Equation 24 and Equation 25 may be substituted in Equation 23.

Also, example embodiments may replace with $\Sigma_{j \neq l} t_{D,jl}^n$ with $c \cdot \max_{j \neq l}\{t_{D,jl}^n\}$, and in this instance, Equation 26 may be expressed as given below.

$$\Delta P_{D,l}^n = \qquad \text{[Equation 26]}$$

$$\left(\frac{w_{D,lk}}{P_{D,l}^n}\left(1+\frac{1}{SINR_{D,l}^n}\right)-c\cdot\max_{j\ne l}\{t_{D,jl}^n\}-\lambda_{D,l}\right)\Bigg/\left(\frac{w_{D,lk}}{(P_{D,l}^n)^2}\left(1+\frac{1}{SINR_{D,l}^n}\right)^2\right)$$

The examples described herein may repeatedly update transmission power through Equation 27.

$$P_{D,l}^n[\kappa+1] = P_{D,l}^n[\kappa] + \Delta P_{D,l}^n \qquad \text{[Equation 27]}$$

In Equation 27, $\Delta P_{D,l}^n$ may be calculated based on one of Equations 22, 23, and 26.

Figure 3:
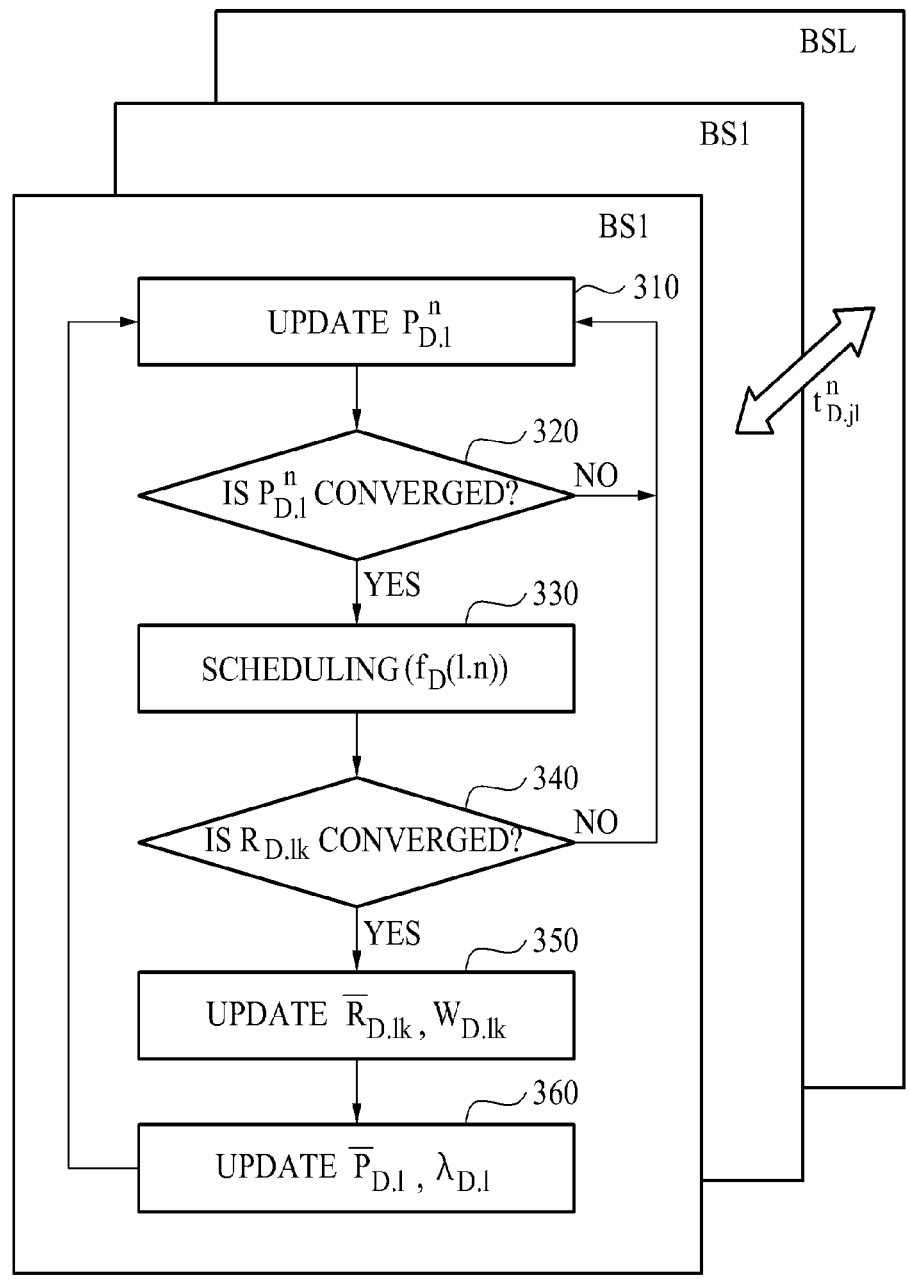
FIG. 3 is a flowchart illustrating an example of a method of base stations in a downlink transmission.

FIG. 3 illustrates an example of a method of base stations in a downlink transmission.

Base stations in a downlink according to various embodiments may share information about priority values of a plurality of cells, interference channel information of a plurality of receivers, and information about a satisfaction with respect to demanded QoS of the plurality of receivers. Also, the base stations may calculate a cost $t_{D,jl}^n$ of a corresponding transmission power based on the shared information.

Referring to FIG. 3, the cost $t_{D,jl}^n$ of the corresponding transmission power is calculated by each of the base stations, and each of the base stations assume that a user schedule is fixed and updates $P_{D,l}^n$ based on the cost $t_{D,jl}^n$ of the corresponding transmission power in operation 310. For example, each of the base stations may update the $P_{D,l}^n$ to maximize a proportional fairness. For example, a KKT method or Newton's method may be used in the update.

In operation 320, each of the base stations may determine whether the $P_{D,l}^n$ updated in operation 310 is converged. When the $P_{D,l}^n$ that is updated in operation 310 is not converged, operation 310 is repeated.

Conversely, when the $P_{D,l}^n$ that is updated in operation 310 is converged, in operation 330, each of the base stations may perform user scheduling by using $f_D(l, n)$. In this example, each of the base stations may determine the user scheduling to maximize a proportional fairness at the transmission power updated in operation 320.

In operation 340, each of the base stations may determine whether $R_{D,lk}$ is converged in the user schedule determined in operation 330. When the $R_{D,lk}$ is not converged, operation 310 is performed again. Conversely, when the $R_{D,lk}$ is converged, $\overline{R}_{D,lk}$ and $w_{D,lk}$ are updated in operation 350. Also, $\overline{P}_{D,l}$ and $\lambda_{D,l}$ are updated in operation 360.

Although FIG. 3 illustrates the operational method of base stations for the downlink, it may be applied to the uplink in a similar manner.

Figure 4:
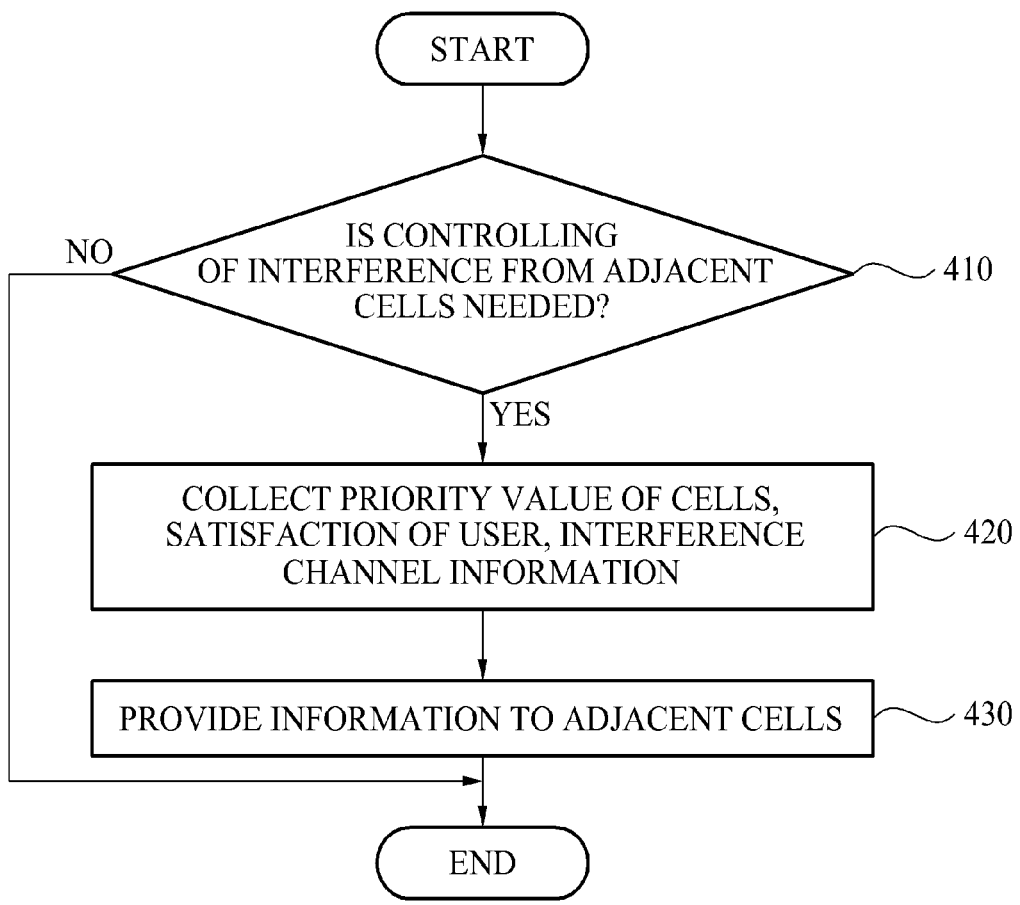
FIG. 4 is a flowchart illustrating an example of a method of a communication device included in a given cell.

FIG. 4 illustrates an example of a method of a communication device included in a given cell.

Referring to FIG. 4, the communication device included in the given cell determines whether to perform controlling on the interference received from adjacent cells in operation 410.

When there is no need to control the interference, the interference algorithm may be terminated. Conversely, when there is a need to control the interference received from the adjacent cells, in operation 420, each of the adjacent cells may collect related information to calculate a cost of a corresponding transmission power.

For example, the related information may include priority values of cells, satisfaction of recognizable users, and interference channel information of the recognizable users. Also, the related information may further include direct channel information of users.

In operation 430, the communication device may provide collected information to adjacent cells.

For example, the communication device may include various types of base stations, relay stations, and terminals.

Figure 5:
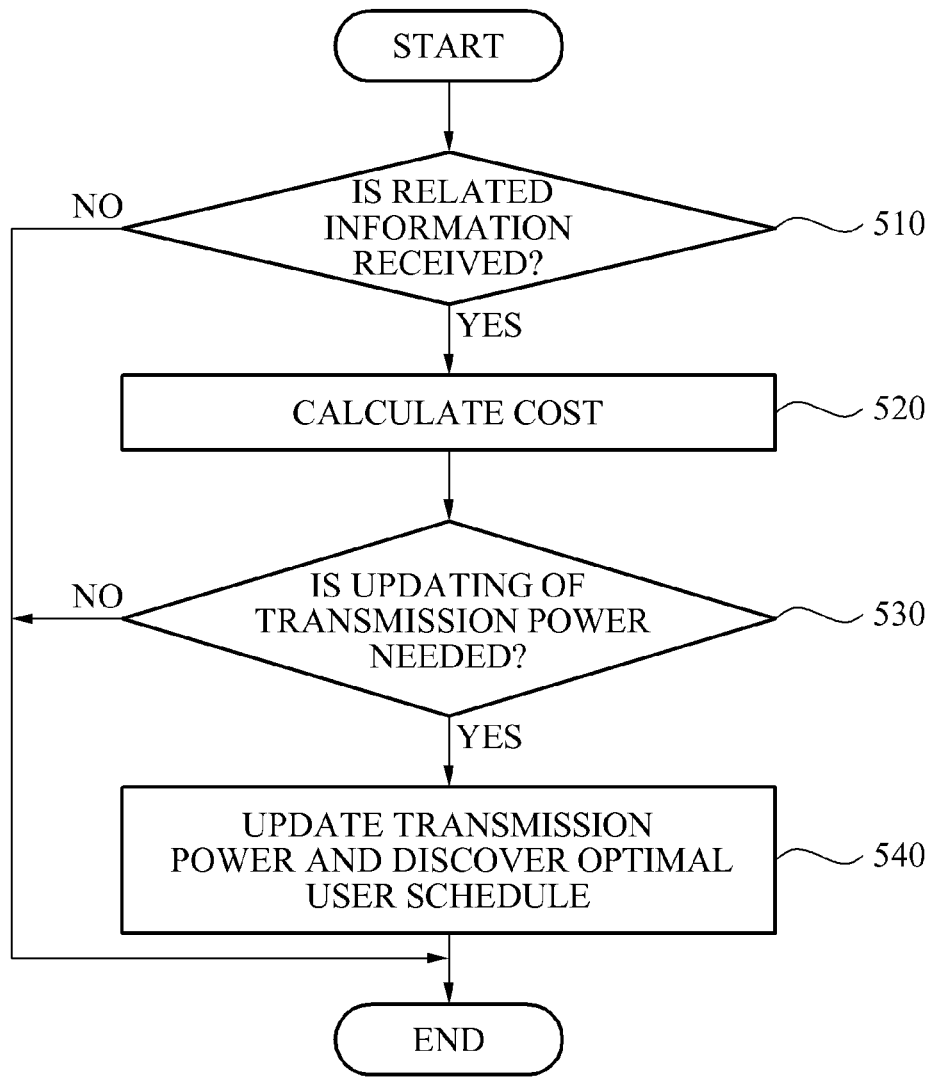
FIG. 5 is a flowchart illustrating an example of a method of a communication device that updates transmission power based on the cost of the transmission power and that determines an optimal user schedule.

FIG. 5 illustrates an example of a method of a communication device that updates transmission power based on the cost of the transmission power and that determines an optimal user schedule.

Referring to FIG. 5, the communication device may determine whether related information is received from adjacent cells in operation 510.

When the related information is not received, the algorithm ends, and when the related information is received, in operation 520, the communication device may calculate a cost of the transmission power.

For example, the communication device may calculate the cost of the transmission power based on a decrease of a transmission rate in at least one neighbor cell that is caused by an increase of the transmission power. The cost may also be calculated based on the satisfaction of a QoS demanded by a target receiver. In addition, the communication device may further consider priority values of various cells. For example, the satisfaction with respect to the demanded QoS of the target receiver may be evaluated based on a target transmission rate of the target receiver, an average transmission rate of the target transmitter, and the like.

In operation 530, the communication device determines whether the transmission power needs to be updated. When the transmission power needs to be updated, in operation 540, the transmission power may be updated as described above, and an optimal user schedule may be determined.

Figure 6:
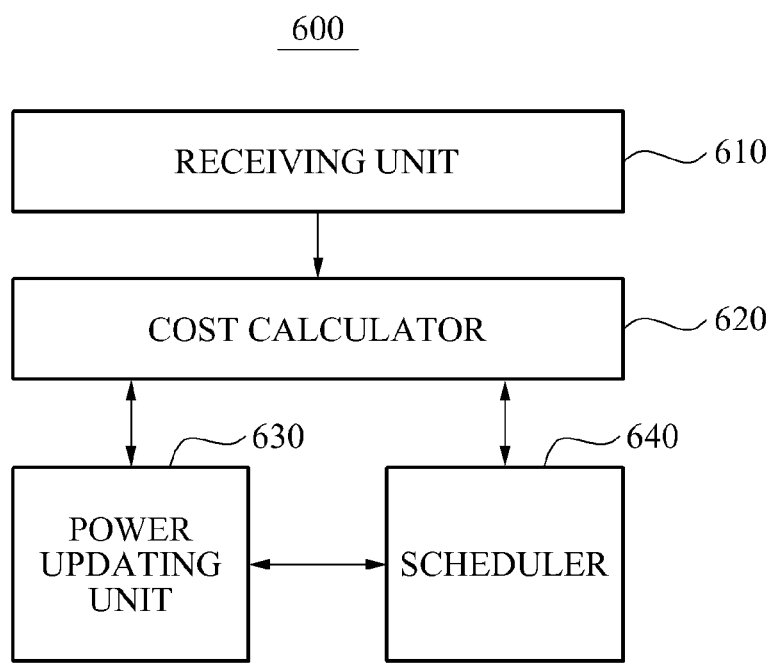
FIG. 6 is a diagram illustrating an example of a communication device.

FIG. 6 illustrates an example of a communication device.

Referring to FIG. 6, the communication device 600 includes a receiving unit 610, a cost calculator 620, a power updating unit 630, and a scheduler 640.

The receiving unit 610 may receive information about priority values of a plurality of cells, interference channel information of a plurality of receivers, and/or information about a satisfaction with respect to demanded QoS of the plurality of receivers, and use the received information to calculate the cost of the transmission power.

The cost calculator 620 may calculate the cost of the transmission power based on a decrease of transmission rate in at least one neighbor cell that is caused by an increase of the transmission power corresponding to a target receiver. The cost may also be calculated based on a satisfaction with respect to a QoS demanded by the target receiver.

The power updating unit 630 repeatedly updates the transmission power based on the calculated cost.

The scheduler 640 may perform user scheduling at the updated transmission power and may update the target receiver.

The descriptions with reference to FIGS. 1 through 5 will be applied to the communication device of FIG. 6, and thus, further description will be omitted.

According to the examples described herein, an optimal transmission power may be determined based on user scheduling and an optimal user schedule may be determined based on transmission power.

According to various embodiments, the cost of a transmission power may be calculated based on the satisfaction of a quality of service demanded by a receiver, and an optimal transmission power and an optimal user schedule may be determined based on the calculated cost. Thus, an overall throughput of a hierarchical-cell communication system or a multi-cell communication system may be improved.

According to various embodiments, the cost of a transmission power may be calculated based on a decrease of a transmission rate in a neighbor cell that is cause by an increase of the transmission power in a target cell. Also, the cost of transmission power may be based on the satisfaction of a quality of service demanded by a receiver, priority values of cells, and/or the like. Thus, an increase of transmission power in the target cell may be accurately evaluated.

According to various embodiments, the cost of a transmission power may be calculated based on information about priority values of a plurality of cells, interference channel information of a plurality of receivers, information about a satisfaction with respect to a demanded quality of service of the plurality of receivers, and the like.

As a non-exhaustive illustration only, the communication device described herein may refer to mobile devices such as a cellular phone, a personal digital assistant (PDA), a digital camera, a portable game console, an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling a transmission power, the method comprising:
receiving information of priority values of respective cells, interference channel information of receivers, and information of a satisfaction of a quality of service demanded by each of the receivers;
calculating a cost of the transmission power used by a first base station in a first cell to transmit, based on
a satisfaction of a quality of service demanded by a neighbor receiver in a neighbor cell,
a derivative of a transmission rate of a neighbor base station to the neighbor receiver in the neighbor cell with respect to the transmission power, and
the information of the priority values of the respective cells, the interference channel information of the receivers, and the information of the satisfaction of the quality of service demanded by each of the receivers; and
repeatedly updating the transmission power based on the cost.

2. The method of claim 1, wherein the calculating comprises calculating the cost of the transmission power based on a priority value of the neighbor cell.

3. The method of claim 1, wherein the calculating comprises updating the cost of the transmission power in response to the repeatedly updating of the transmission power.

4. The method of claim 1, further comprising evaluating the satisfaction based on a target transmission rate of the neighbor base station to the neighbor receiver, and an average transmission rate of the neighbor base station to the neighbor receiver.

5. The method of claim 1, wherein a priority value of the neighbor cell is set differently based on whether the neighbor cell is a macrocell or a small cell.

6. The method of claim 1, further comprising determining whether a transmission rate of the first base station to a first receiver in the first cell is converged in order to determine the transmission power to be used.

7. The method of claim 6, further comprising updating an average of the transmission rate of the first base station to the first receiver, and a satisfaction of a quality of service demanded by the first receiver, based on the transmission rate of the first base station to the first receiver, in response to the transmission rate of the first base station to the first receiver being determined to be converged.

8. The method of claim 6, further comprising updating an average of the transmission power based on the transmission rate of the first base station to the first receiver, in response to the transmission rate of the first base station to the first receiver being determined to be converged.

9. The method of claim 1, wherein the updating comprises repeatedly updating the transmission power based on a Karush-Kuhn-Tucker (KKT) method or a Newton's method.

10. The method of claim 1, further comprising calculating the cost of the transmission power based the following equation:

$$t_{D,jl}^n = w_{D,jk'} \frac{\Gamma|h_{ljk'}^n|^2}{P_{D,j}^n|h_{jjk'}^n|^2} \left( \frac{(SINR_{D,j}^n)^2}{1 + SINR_{D,j}^n} \right),$$

with $k^j = f_D(j, n)$, wherein t is the cost at an $n^{th}$ frequency in a downlink D from the first base station I due to the neighbor base station j, w is the satisfaction, k' is the neighbor receiver, $\Gamma$ is a signal-to-noise ratio gap corresponding to a selection of a modulation scheme and a coding scheme, h is a channel, P is a transmission power, SINR is a signal-to-interference-plus-noise ratio, and f is a user scheduling function.

11. A method of performing user scheduling and controlling transmission power, the method comprising:
receiving information of priority values of respective cells, interference channel information of receivers, and information of a satisfaction of a quality of service demanded by each of the receivers;
calculating a cost of the transmission power used by a first base station in a first cell to transmit, based on
  a satisfaction of a quality of service demanded by a neighbor receiver in a neighbor cell,
  a derivative of a transmission rate of a neighbor base station to the neighbor receiver in the neighbor cell with respect to the transmission power, and
  the information of the priority values of the respective cells, the interference channel information of the receivers, and the information of the satisfaction of the quality of service demanded by each of the receivers;
repeatedly updating the transmission power based on the cost; and
performing the user scheduling at the updated transmission power to update a first receiver in the first cell.

12. The method of claim 11, wherein the performing comprises performing the user scheduling based on a proportional fairness scheme at the updated transmission power to maximize a weighted total transmission rate.

13. The method of claim 11, wherein the calculating comprises calculating the cost of the transmission power based on a priority value of the neighbor cell.

14. A non-transitory computer-readable storage medium storing a program that controls a transmission power, the program comprising instructions to cause a processor to:
receiving information of priority values of respective cells, interference channel information of receivers, and information of a satisfaction of a quality of service demanded by each of the receivers;
calculating a cost of the transmission power used by a first base station in a first cell to transmit, based on
  a satisfaction of a quality of service demanded by a neighbor receiver in a neighbor cell,
  a derivative of a transmission rate of a neighbor base station to the neighbor receiver in the neighbor cell with respect to the transmission power, and
  the information of the priority values of the respective cells, the interference channel information of the receivers, and the information of the satisfaction of the quality of service demanded by each of the receivers; and
repeatedly updating the transmission power based on the cost.

15. A communication device comprising:
a receiving unit configured to receive information of priority values of respective cells, interference channel information of receivers, and information of a satisfaction of a quality of service demanded by each of the receivers,
wherein the communication device is further configured to calculate a cost of a transmission power used by a first base station in a first cell to transmit, based on
  a satisfaction of a quality of service demanded by a neighbor receiver in a neighbor cell,
  a derivative of a transmission rate of a neighbor base station to the neighbor receiver in the neighbor cell with respect to the transmission power, and
  the information of the priority values of the respective cells, the interference channel information of the receivers, and the information of the satisfaction of the quality of service demanded by each of the receivers, and
wherein the communication device is further configured to repeatedly update the transmission power based on the cost.

16. The communication device of claim 15, wherein the cost calculator is further configured to calculate the cost of the transmission power based on a priority value of the neighbor cell.

17. The communication device of claim 15, further comprising a scheduler configured to perform user scheduling at the updated transmission power to update a first receiver in the first cell.

* * * * *